(12) United States Patent
Roffet (10) Patent No.: US 9,202,132 B2
(45) Date of Patent: Dec. 1, 2015

(54) VIRTUAL IMAGE GENERATION

(71) Applicant: ST-Ericsson SA, Plan-les-Ouates (CH)

(72) Inventor: Frederique Roffet, Coublevie (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 0 days.

(21) Appl. No.: 14/375,174

(22) PCT Filed: Feb. 13, 2013

(86) PCT No.: PCT/EP2013/052877
§ 371 (c)(1),
(2) Date: Jul. 29, 2014

(87) PCT Pub. No.: WO2013/127631
PCT Pub. Date: Sep. 6, 2013

(65) Prior Publication Data
US 2014/0369604 A1    Dec. 18, 2014

Related U.S. Application Data

(60) Provisional application No. 61/614,166, filed on Mar. 22, 2012.

(30) Foreign Application Priority Data

Feb. 27, 2012    (EP) .................................. 12305230

(51) Int. Cl.
*G06K 9/46* (2006.01)
*G06T 5/00* (2006.01)
(Continued)

(52) U.S. Cl.
CPC  *G06K 9/46* (2013.01); *G06K 9/342* (2013.01); *G06K 9/56* (2013.01); *G06K 9/6201* (2013.01); *G06T 3/40* (2013.01); *G06T 5/001* (2013.01); *G06T 5/002* (2013.01); *G06T 5/20* (2013.01); *G06T 5/30* (2013.01); *G06K 2009/4666* (2013.01); *G06K 2009/6213* (2013.01); *G06T 2207/20021* (2013.01)

(58) Field of Classification Search
CPC .......... G06K 9/46; G06K 9/342; G06K 9/56; G06K 9/6201; G06K 2009/6213; G06K 2009/6215; G06K 15/1848; G06K 2009/4666; G06T 3/40; G06T 3/4007; G06T 5/001; G06T 5/002; G06T 5/20; G06T 5/30; G06T 2207/20021; G06T 2207/20182
See application file for complete search history.

(56) References Cited

U.S. PATENT DOCUMENTS 5,255,354 A * 10/1993  Mahoney ...................... 382/203
5,570,433 A * 10/1996  Nagamine et al. ............ 382/255
(Continued)

OTHER PUBLICATIONS

S. Auberger, et al.; "Digital Video Stabilization Architecture for Low Cost Devices"; Proceedings of the 4th International Symposium on Image and Signal Processing and Analysis (2005); IEEE Explore; Sep. 15-17, 2005; pp. 474-479.
(Continued)

*Primary Examiner* — Manav Seth
(74) *Attorney, Agent, or Firm* — Patent Portfolio Builders PLLC (57) ABSTRACT

There is described a method for the creation of at least a second, virtual image (200) from a first image (100) captured by a user or retrieved from a storage device to aid interpretation of image content. This allows, for instance, implementing a multishot image quality enhancement scheme based on the real image and the virtual image.

14 Claims, 7 Drawing Sheets

(51) Int. Cl.

| | |
|---|---|
| G06K 9/34 | (2006.01) |
| G06K 9/56 | (2006.01) |
| G06K 9/62 | (2006.01) |
| G06T 3/40 | (2006.01) |
| G06T 5/30 | (2006.01) |
| G06T 5/20 | (2006.01) |

(56) References Cited

U.S. PATENT DOCUMENTS

| | | | | |
|---|---|---|---|---|
| 5,717,782 | A * | 2/1998 | Denneau, Jr. | 382/154 |
| 5,809,182 | A * | 9/1998 | Ward et al. | 382/298 |
| 5,875,040 | A * | 2/1999 | Matraszek et al. | 358/453 |
| 6,148,115 | A * | 11/2000 | Mackinnon et al. | 382/266 |
| 6,252,576 | B1 * | 6/2001 | Nottingham | 345/660 |
| 6,933,983 | B2 * | 8/2005 | Wredenhagen et al. | 348/618 |
| 8,582,916 | B2 * | 11/2013 | Bar-Aviv et al. | 382/275 |
| 8,605,970 | B2 * | 12/2013 | Bar-Aviv et al. | 382/128 |
| 8,842,907 | B2 * | 9/2014 | Buehler | 382/162 |
| 2004/0218828 | A1 * | 11/2004 | Aiso | 382/254 |
| 2005/0201618 | A1 * | 9/2005 | Tek | 382/173 |
| 2005/0244073 | A1 * | 11/2005 | Keshet | 382/260 |
| 2006/0013499 | A1 * | 1/2006 | Namie et al. | 382/254 |
| 2006/0114354 | A1 * | 6/2006 | Koyanagi et al. | 348/581 |
| 2010/0272340 | A1 * | 10/2010 | Bar-Aviv et al. | 382/131 |
| 2013/0202177 | A1 * | 8/2013 | Bar-Aviv et al. | 382/131 |
| 2014/0043351 | A1 * | 2/2014 | Karlov et al. | 345/589 |

OTHER PUBLICATIONS

Z. Wang, et al.; "Image Quality Assessment: From Error Visibility to Structural Similarity"; IEEE Transaction On Image Processing, vol. 13, No. 4; Apr. 2004; pp. 1-14.

International Search Report issued in corresponding International application No. PCT/EP2013/052877, date of mailing Jun. 4, 2013.

Written Opinion of the International Searching Authority issued in corresponding International application No. PCT/EP2013/052877, date of mailing Jun. 4, 2013.

Extended European Search Report issued in corresponding European application No. EP 12 30 5230, date of completion Jun. 12, 2012.

Buades, Antoni et al., "A non-local algorithm for image denoising," 2005 IEEE Computer Society Conference on Computer Vision and Pattern Recognition, Piscataway, NJ, vol. 2, Jun. 20, 2005, pp. 60-65, XP010817500, DOI: 10.1109/CVPR.2005.38, ISBN:978-0-7695-2372-9.

Salmon, Joseph, "On Two Parameters for Denoising with Non-Local Means," IEEE Signal Processing Letters, IEEE Service Center, Piscataway, NJ, vol. 17, No. 3, Mar. 1, 2010, pp. 269-272, XP011298519, ISSN: 1070-9908.

* cited by examiner

VIRTUAL IMAGE GENERATION

TECHNICAL FIELD

The present invention relates to the generation of virtual images from real images, and more particularly to a method and a device for creating second and/or subsequent images from a first image captured by a user or retrieved from a storage device. Without loss of generality, the present invention relates to interpretation of image content, e.g., spatial and/or temporal noise reduction algorithms in the processing of images in colour image pipelines.

It finds application, for instance, in wireless devices having imaging features or functionalities, such as digital cameras, mobile telephone handsets, PDA, and other mobile devices as well as static or desktop processing devices.

BACKGROUND

In image and video processing, it may be preferable for some algorithms to capture several shots of a given scene to improve or realise a specific, e.g. noise reduction process so as to obtain one image of the scene having enhanced quality.

These shots are often captured in different conditions, such as, for example, light conditions or exposure time, to fit with specific applications.

Digital images, namely images that have been captured and digitised take the form of a generally rectangular array of, for example digital, values. For a bi-dimensional image, the association of a point in the array and of grey levels or colour levels, for instance red, blue and green levels in a RGB colour space, is called a pixel. Pixels may be likened to points on a grid having a corresponding grey level value or corresponding colour level values. For example, the grey level values or colour level values at any given pixel can be either an integer or a real number.

Each point is the result of a measurement that can be made by a matrix or a strip of light sensors such as couple charge devices (CCDs) or a CMOS imaging device. In a small square of e.g. the CCD matrix corresponding to a point, the number of photons arriving in a given period of time is counted. The arrival of said photons follows a random process introducing fluctuations about a mean value. Each sensor may further produce noise which is superimposed on the photon count. Images obtained by other methods such as photosensitive paper printing, also exhibit noise caused by the e.g. chemical characteristics in the backing used; this noise is retained during the digitisation of the photograph.

Most digital images therefore contain noise as a random disturbance of the value of the points. The degree of noise can depend on the grey or colour levels of the point, and on the illumination conditions. For instance, it may happen that there is more noise in brighter parts of an image even if the signal-to-noise ratio is better than at other points of the same image.

A signal-to-noise ratio is used to designate the proportion of a grey or colour level that may originate from noise. Noise becomes detectable when a mean amplitude or standard deviation is exceeded. It is desirable to eliminate noise from images since it impairs the clarity and detail of images. However, if noise is removed with an average filter, the image may become noise free but totally blurry and not sharper, actually.

In processes requiring the use of algorithms, particularly so-called denoising algorithms, several shots may be captured of the same content in the same light conditions and used as basis for processing. Comparison of the captured shots aids in noise and detail discrimination.

In High Dynamic Range (HDR) algorithms, several shots may be captured with a different exposure time. Lightest and darkest areas of an image are revealed by adapting control of the exposure time to allow a greater dynamic range of luminescence.

The use of a flash in image capture increases image quality but can generate unwanted effects such as red eye or can result in an over exposed area. In red eye detection and elimination schemes, shots are taken with and without use of a flash. Comparison between the shots means the position of the eyes can be detected and the flash image can be used for HDR algorithms.

Because many denoising algorithms are unable to differentiate between noise and small details of the image, a number of shots may be used as a comparator to help distinguish between image detail and noise.

However, the content of multiple shots are seldom aligned due to, for example, user hand or scene movement between image acquisitions. The resulting mismatch is problematic for the data merge step. For that reason, some algorithms use stabilisation methods to align the data prior to data crop along the image border. However, the efficiency of such methods is correlated with their complexity and requires specific architecture. Further information regarding this correlation is described, for instance, by Auberger and Miro in "Digital video stabilization architecture for low cost devices", Proceedings of the 4$^{th}$ International Symposium on Image and Signal Processing and Analysis, 2005.

Furthermore, the capture and storing of multiple images requires additional memory to store the data of each shot, additional power during image capture and a means of traffic management between each frame captured. Additionally, the required stabilisation step is complicated by the absence of a standardised time lapse between each shot common to device manufacturers, with longer time lapse periods resulting in a greater difference between shots and a subsequent increased difficulty in stabilisation.

SUMMARY

The present invention seeks to address at least some of the above problems.

According to a first aspect, there is provided a method of creating at least a second image from a first image defined by pixel values, comprising:

selecting a first pixel in the first image at a position defined by first coordinates in the first image;

defining a first neighbourhood of pixels around, for instance centred on the first pixel of the first image, the first neighbourhood of pixels having defined size and position;

defining a further neighbourhood of pixels as a search area window of defined size and position sufficient to contain at least the first pixel in the first image;

selecting second and subsequent pixels in the first image, said second and subsequent pixels being different from the first pixel and being contained within the search area window;

defining second and subsequent neighbourhoods of pixels of defined size and position around each second and subsequent pixel selected, respectively, said size of said second and subsequent neighbourhoods of pixels corresponding to the size of the first neighbourhood of pixels;

computing distance values between the first neighbourhood of pixels on the one hand, and second and subsequent neighbourhoods of pixels on the other hand;

processing the computed distance values;

selecting a second or subsequent neighbourhood of pixels corresponding to a chosen distance value;

selecting a reference pixel in the first image corresponding to the pixel in the first image associated with the selected neighbourhood of pixels;

attributing the value of the selected reference pixel to a first pixel at defined position in the second image corresponding to the position of the first pixel in the first image relative to the first image boundaries, for instance the position defined by the same coordinates as the coordinates defining the position of the first pixel in the first image; and completing the second image by repeating the above steps for further, for instance for all pixels in the first image.

The second image may be regarded as a virtual image created from the first image, and can be used by an image processing algorithm using multi-shots, for instance a noise reduction algorithm which processes more than one shot of a given scene as presented herein above in the introduction.

In some embodiments, only part of the pixels of the second (virtual) image are created according to the above steps of the proposed method, the other pixels being simply copied from the first (real) image. Such embodiment may be useful to limit the processing time when only some areas of interest within the real image need to be processed using a de-noising algorithm or a HDR algorithm, for instance, as described in the introduction. Such an area of interest may be, for example, an area of the image containing a moving object, a character, portions edges, etc.

The set of pixels described as a neighbourhood around a defined pixel may be square in shape, thus making the algorithm simpler, but can be of any desired shape depending on the specific implementation, for instance rectangular, circular, etc. This neighbourhood of pixels may be centred on said defined pixel in the first image, which makes the method easier to implement.

In some embodiments, the distance value is selected based on criteria including the distance value at a specific point within the range of distances computed between defined neighbourhoods. In one example, the distance value selected is the lowest distance value computed in pixel values.

In some embodiments, the first image may be defined in a colour space having more than one colour channel, for example a digital RGB colour space having three channels associated with colours Red, Green and Blue, respectively. In this case, pixels values each comprise a plurality of pixel component values, respectively associated with one of the channels. The pixel component values of the first image having at least two channels may thus be used to compute distance values for either one or all of these channels. A distance selected according to any or a combination of magnitude of distance, computational formula or colour space within the image, is implemented into the corresponding channel from which it was selected. Alternatively, the distance selected may be implemented in all channels or only those channels selected to create the most beneficial virtual image according to the desired end result.

The method may also comprise additional steps of selecting a further neighbourhood among the second and subsequent neighbourhoods of pixels corresponding to a further chosen distance value; selecting a further reference pixel corresponding to the further selected neighbourhood; attributing the pixel value of the further selected reference pixel to a defined position in a further image; and completing the further image by repeating these steps for further pixels in the first image. These additional steps can be repeated to create as many further virtual images as desired in specific implementation.

An alternative for creating the further virtual image is to compute distances between the first pixel neighbourhood and the second or subsequent pixel neighbourhoods selected in a colour space different from that in which the distances have been computed for creating the second, virtual image.

In some embodiments, selection parameters, such as distance criteria, distance computation formula, search area window shape or size, selection and use of colour channels, of the first, second and/or subsequent neighbourhoods of pixels is modified for the creation of a further virtual image compared with the implementation of method steps for the creation of the second, virtual image or of any preceding virtual image following said second image.

The image content of the first image may be interpreted by a process of pixel reorganisation preserving the content of the first image that reorganises noise level in the second image by pixel location. The virtual information generated from the real information can thus be used in a range of image or video processing algorithms using multi-shots.

According to a second aspect, there is thus proposed a method of enhancing quality of a real image comprising:

generating at least one virtual image from the real image by applying the method of the first aspect;

implementing a multi-shot image quality enhancement scheme based on the real image and the virtual image.

In some embodiments, the multi-shot image quality enhancement scheme is one of Temporal Noise Reduction algorithm, Spatial Noise Reduction algorithm, and Digital Image Stabilization algorithm.

For example, in spatial noise reduction algorithms, such as bilateral filter and non local means of block matching, the results are combined to increase the final image quality. For example, in temporal noise reduction algorithms, the temporal dimension is used to help the discrimination between noise and detail with the aid of the virtual image or images, thus replacing or completing use of additional real images captured.

In the context of Digital Image Stabilisation (DIS), as a response to limited success in the use of decreased exposure time to reduce image blurring, virtual images may be created as an aid to noise and/or detail discrimination thus negating the need for the capture of further real images. The equipment used for image capture and storage need not therefore provide high levels of power and memory and de-noising algorithms may be optimised and simplified.

Where multi-shots should be taken at different conditions or where there would be a large degree of movement between at least two real images, the High Dynamic Range algorithms of the present invention may be used to expand the level of information and reduce noise by processing a real image using a virtual image created according to the proposed method as second or further image.

In the domain of image quality metrics, the method may be used to provide at least one reference image to assess image quality. By example, in peak signal-to-noise ratio (PSNR) metrics, structural similarity index metrics (SSIM) and DeltaE metrics, a reference image is used to detect the level of similarity or colour shift between the virtual reference image and a real original image. The similarity between the real image and a virtual image generated according to the proposed method may be used to assess noise level in the original image where there is an absence of reference image or those that exist are inferior and therefore unsuitable.

According to a third aspect, there is thus proposed a method of assessing the quality of a real image comprising:
generating at least one virtual image from the real image by applying the method of the first aspect;
computing an image quality metric for the real image based on the virtual image as reference image.

For example, the reference metric is one of a peak signal-to-noise ratio (PSNR) metric, a structural similarity index (SSIM) metric, and a DeltaE metric.

According to a fourth aspect, there is proposed a computer program product comprising instructions for implementing all the steps of the method to create at least a second image from a first image as defined above, when the program is executed by a processor.

According to a fifth aspect, there is further proposed a device adapted to create at least a second image from a first image, defined by pixel values, the device having processing blocks comprising:
a first selection block adapted to select a first pixel in the first image at a position defined by first coordinates in the first image;
a first definition block adapted to define a first neighbourhood of pixels around the first pixel of first image, the first neighbourhood of pixels having defined size and position;
a second definition block adapted to define a further neighbourhood of pixels as a search area window of defined size and position sufficient to contain the first pixel in the first image;
a second selection block adapted to select second and subsequent pixels in the first image, said second and subsequent pixels being contained within the search area window;
a third definition block adapted to define second and subsequent neighbourhoods of pixels of defined size and position around each second and subsequent pixel, respectively, corresponding to the size and position of the first neighbourhood of pixels relative to the first pixel in the first image;
a computation block adapted to compute distance values between the first neighbourhood of pixels on the one hand, and second and subsequent neighbourhoods of pixels on the other hand;
a processing block adapted to process the computed distance values;
a third selection block adapted to select a second or subsequent neighbourhood of pixels corresponding to a chosen distance value;
a fourth selection block adapted to select a reference pixel in the first image associated with the selected neighbourhood of pixels;
an attribution block adapted to attribute the selected reference pixel to a pixel at defined position in the second image corresponding to the position of the first pixel in the first image relative to the first image boundaries; and
a managing unit adapted to complete the second image by causing the processing blocks of the device to process further pixels of the first image in the same manner as the first pixel.

Finally, a sixth aspect relates to a wireless electronic device comprising a processing device according to the third aspect.

Further features and advantages of the invention will be made apparent from the following description and the claims.

BRIEF DESCRIPTION OF THE DRAWINGS

Embodiments will now be described, by way of example only, with reference to the accompanying drawings, in which.

SPECIFIC DESCRIPTION

Figure 1:
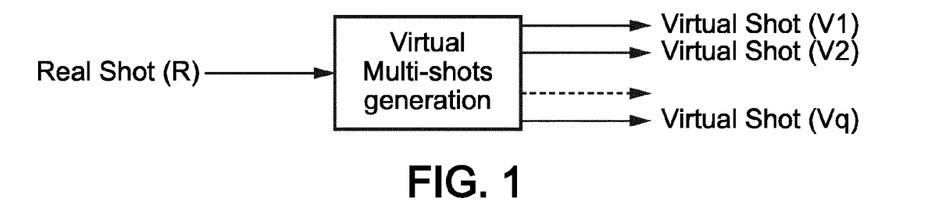
FIG. 1 is a diagram showing the concept of the present method.

FIG. 1 illustrates the basic concept of the invention, wherein at least a second image is created from first image R. For example, first image R is a previously captured real image stored in an image capture device or retrieved from a remote storage medium. For example, the second image is a virtual image created from the first image R describing the content of real image R under the same light conditions as those at capture of real image R. More than one virtual image can be generated from the same real image, R. In the shown example, a number q of virtual images V1 to Vq are generated, where q is an integer greater than unity.

Figure 2:
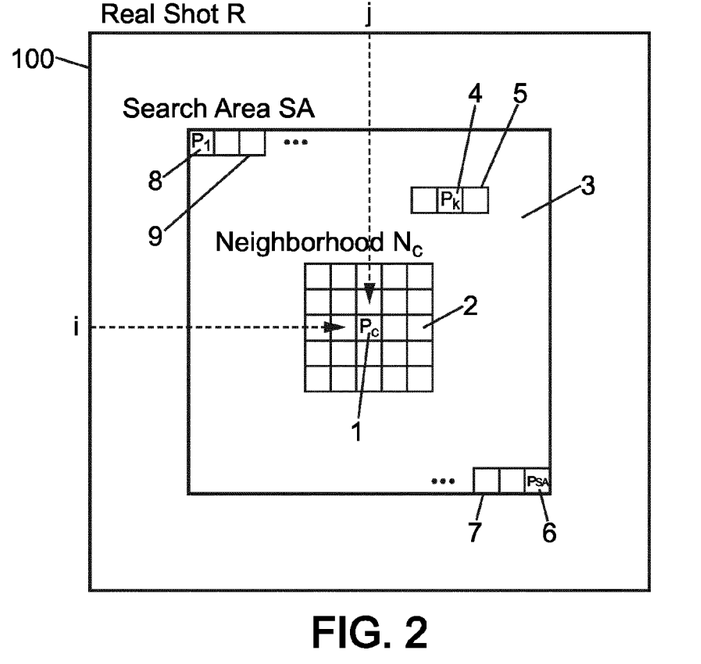
FIG. 2 is a diagram showing the steps of variables definition.

With reference to an embodiment as shown in FIG. 2, a real image 100 having size m×n, in which m and n are positive integers, is defined as having a first pixel 1, designated by $p_c$ in the drawings, and located at position defined by coordinates (i, j), where $1 \leq i \leq m$ and $1 \leq j \leq n$. A block of pixels called a first neighbourhood 2 in what follows, shown, for example, as a linear array of size $N_m \times N_n$, is defined around the first pixel 1, where $N_m$ and $N_n$ are integers greater than unity. In the shown example, the first neighbourhood 2 is centred around the first pixel 1, but other configurations are possible wherein the first neighbourhood 2 is located around but not centred around the first pixel 1. In the following description and in the drawings, this first neighbourhood 2 is designated by $N_c$, where is greater than 0 but smaller than $SA_m \times SA_n$.

A search area window 3 having the dimensions $SA_m \times SA_n$ is further defined to include the first pixel 1 and thus at least a part of the first neighbourhood 2, where $SA_m$ and $SA_n$ are integers greater than unity.

As will become apparent from description of FIG. 3 below, further pixels in the image 100 will also be considered and further corresponding neighbourhoods will also be defined and considered.

In the example shown in the drawings, a block of pixels is defined by parameters which include the co-ordinates of the associated, e.g. central pixel on the one hand, and its dimensions $N_m$ and $N_n$ in a given two dimensional reference system on the other hand. It will be appreciated, however, that blocks of pixels may be defined in any other manner suitable for the given implementation, with associated parameters.

Within the search area 3, there is a number $SA_m \times SA_n$ of pixels, from pixel 8 at the top left corner to pixel 6 at the bottom right corner of the search area 3. With reference to FIG. 3, at least a second pixel 4 may further be selected among these pixels, and a second neighbourhood 5, having e.g. the same dimensions $N_m \times N_n$ as the neighbourhood 2, may be defined and associated with pixel 4. In the following description and in the drawings, this second neighbourhood 5 is designated by $N_k$, where k is greater than 0 but smaller than $SA_m \times SA_n$.

Figure 3:
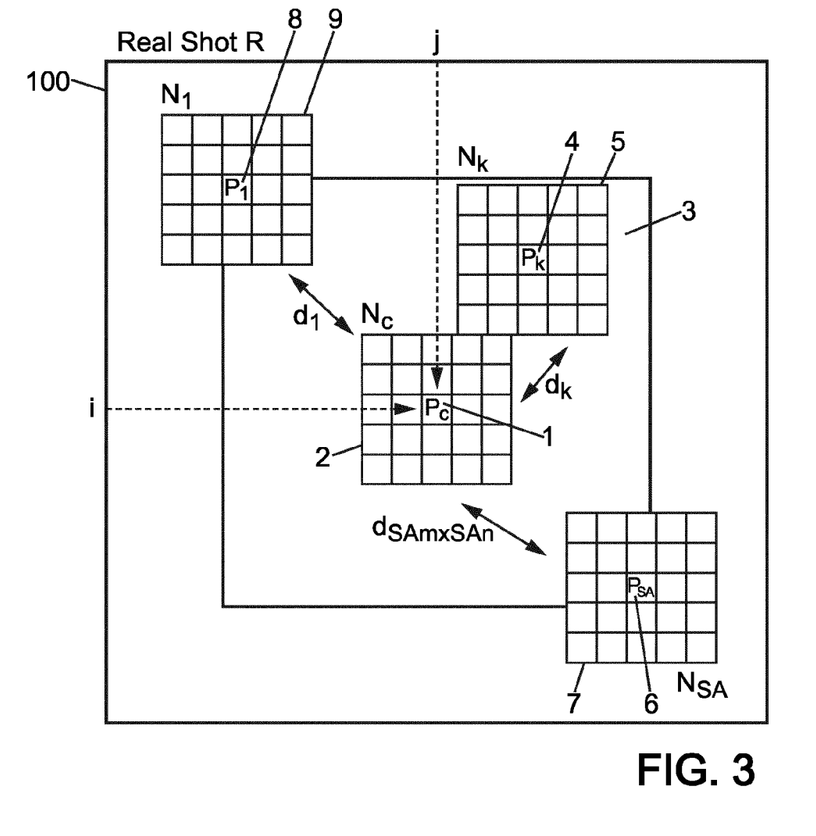
FIG. 3 is a diagram showing distance computation between two blocks according to an embodiment.

As shown in FIG. 3, neighbourhoods 9 and 7 are respectively defined and associated with the end pixels 8 and 6 of the search area 3, respectively. Said further neighbourhoods 9 and 7 are designated by $N_1$ and $N_{SA}$, respectively, in the following description and in the drawings.

In one example, a number $SA_m \times SA_n - 1$ second and subsequent pixels are defined and considered which cover all pixels within the search area SA other than the first pixel 1, from the top left pixel 8 to the bottom right pixel 6. Also, a number $SA_m \times SA_n - 1$ of associated neighbourhoods are defined and considered, from neighbourhood 9 associated to pixel 8 to neighbourhood 7 associated to pixel 6. Embodiments are in no way limited to this example, since not all pixels and associated neighbourhoods need to be considered within the search area 3, depending on the expected results.

In the shown example, neighbourhoods are defined as regular arrays, containing but not necessarily centred upon, the selected pixels 6, 8. It shall be appreciated that other shapes may be preferred, depending on the intended application.

FIG. 3 further illustrates a computation step according to an embodiment of the proposed method in which the distance between a first and a second or any subsequent neighbourhood is computed. The parameters of the first neighbourhood 2 and second and subsequent neighbourhoods like neighbourhoods 5, 7 and 9 for instance, shown in this instance as area or matrix arrays, are processed by an algorithm based on an equation using, for example, a Euclidean metric as shown on the right side of FIG. 3. Such an algorithm, as such, may be regarded as a kind of block matching algorithm, as will become apparent from the following.

Within the real shot 100 is defined a first neighbourhood 2 centred on a first pixel 1, second and subsequent pixels 4, 6, 8 having been selected and corresponding second and subsequent neighbourhoods, 5, 7, 9 respectively, defined. The calculation of and relationship between respective distances between the first neighbourhood 2 and second and subsequent neighbourhoods 5, 7, 9 may be understood from the formula below, with the values of parameters c and k of second and subsequent neighbourhoods 5, 7 described such that:

$$d_k(N_k, N_c) = \sqrt{\left(\sum_{i=1}^{f}(k_i - c_i)^2\right)}$$

wherein $d_k$ is, for example, the minimum distance between defined neighbourhoods, $N_k$ is a defined neighbourhood of pixels, k ranging from 1 to f and $N_c$ is a defined neighbourhood of pixels, c ranging from 1 to f, $k_i$ is the value corresponding to pixels k at position i with i ranging from 1 to f, and $c_i$ is the value corresponding to pixel c at position i, with i ranging from 1 to f. For the sake of avoiding any misunderstanding, it shall be appreciated that index i used in the above formula and on the right side of FIG. 3, shall not be confused with the first coordinate of coordinates (i, j) of pixel 1.

To locate and select the neighbourhood having the most favourable matching characteristics with reference to any desired technical function, the plurality of distance values generated during the first step block matching step are collated.

Figure 4:
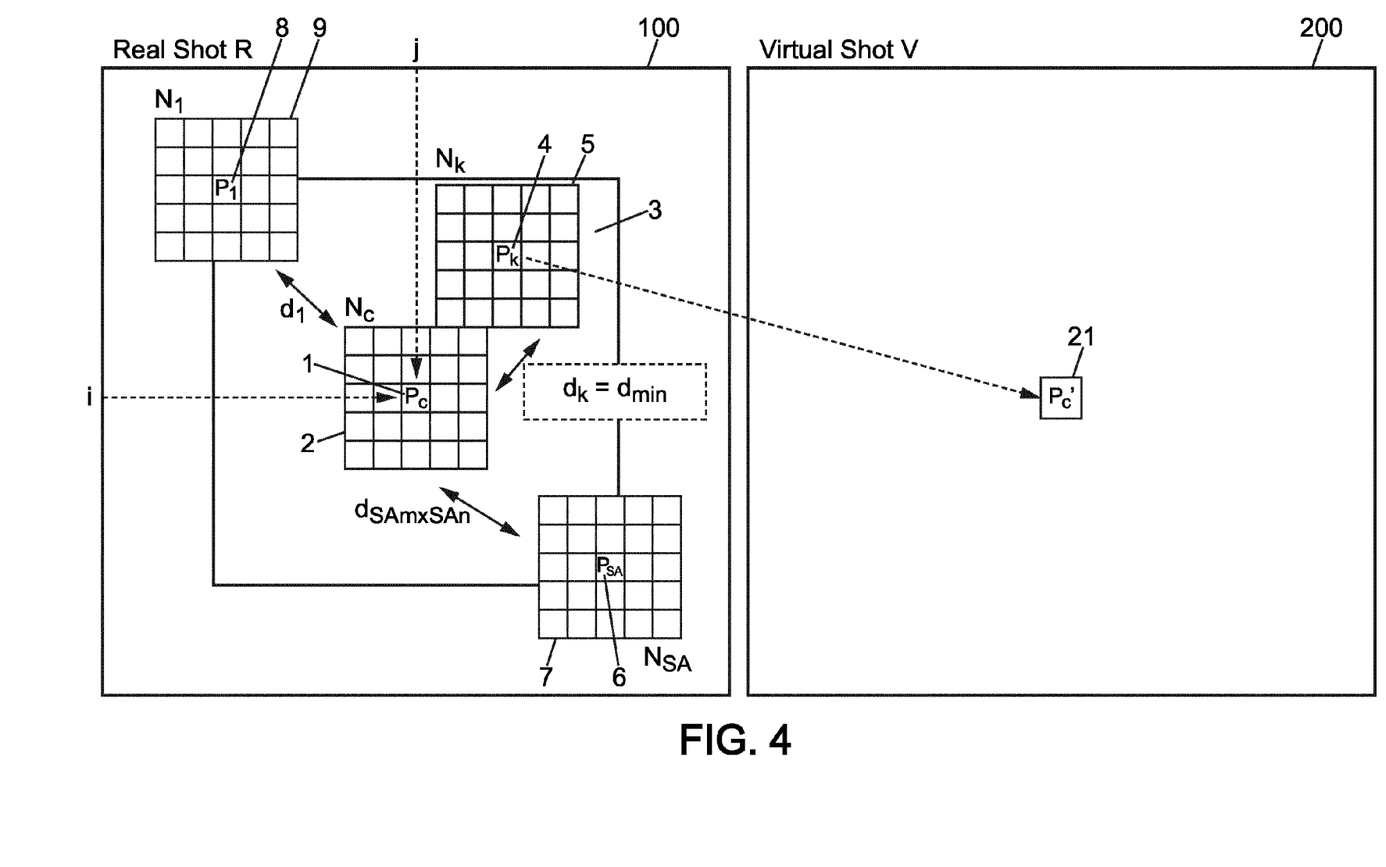
FIG. 4 is a diagram showing virtual shot pixel attribution.

FIGS. 3 and 4 show distance values $d_1$, $d_k$ and $d_{SAm \times SAn}$ corresponding to the distances between the first neighbourhood 2 and second and subsequent neighbourhoods 5, 7 and 9 respectively. According to the embodiment illustrated by FIG. 4, the distance value selected is the lowest distance value. The distance value calculated between the first neighbourhood 2 and the second or subsequent neighbourhood selected based on the desired criteria, namely the second neighbourhood 5 in this instance, is attributed to the parameter $d_{min}$, which is the calculated value of $d_k$ as described above.

The values at the selected pixel 4, in this instance the second selected pixel 4 associated to the selected neighbourhood 5, are attributed to a first pixel 21 of the second image 200. For example, said first pixel 21 of the second image 200 has a location corresponding to a position relative to the boundary of the second image that is the same as that of the first selected pixel 1 relative to the boundary of the first image 100, namely a position defined by the coordinates (i, j). Other options are possible, though being more complex to implement.

The above steps are repeated for other pixels of the real image 100, namely for pixels at positions defined by other values of the coordinates (i, j).

It shall be appreciated that, for pixels located at the edge or near the edge of the real image 100, the size and/or position of the search area window 3, and/or the size and/or position of the neighbourhoods may be adapted. For this reason, also, the term "around" used in the present description shall be interpreted in a broad sense. In a variant, the real image may be extended by defining a frame of added pixels which may be generated by any known technique such as by copying one or averaging at least some of the closest pixels. Any alternative for dealing with such side effects of image pixel block processing, which is known by the one with ordinary skills in the art, may be used instead.

Figure 5:
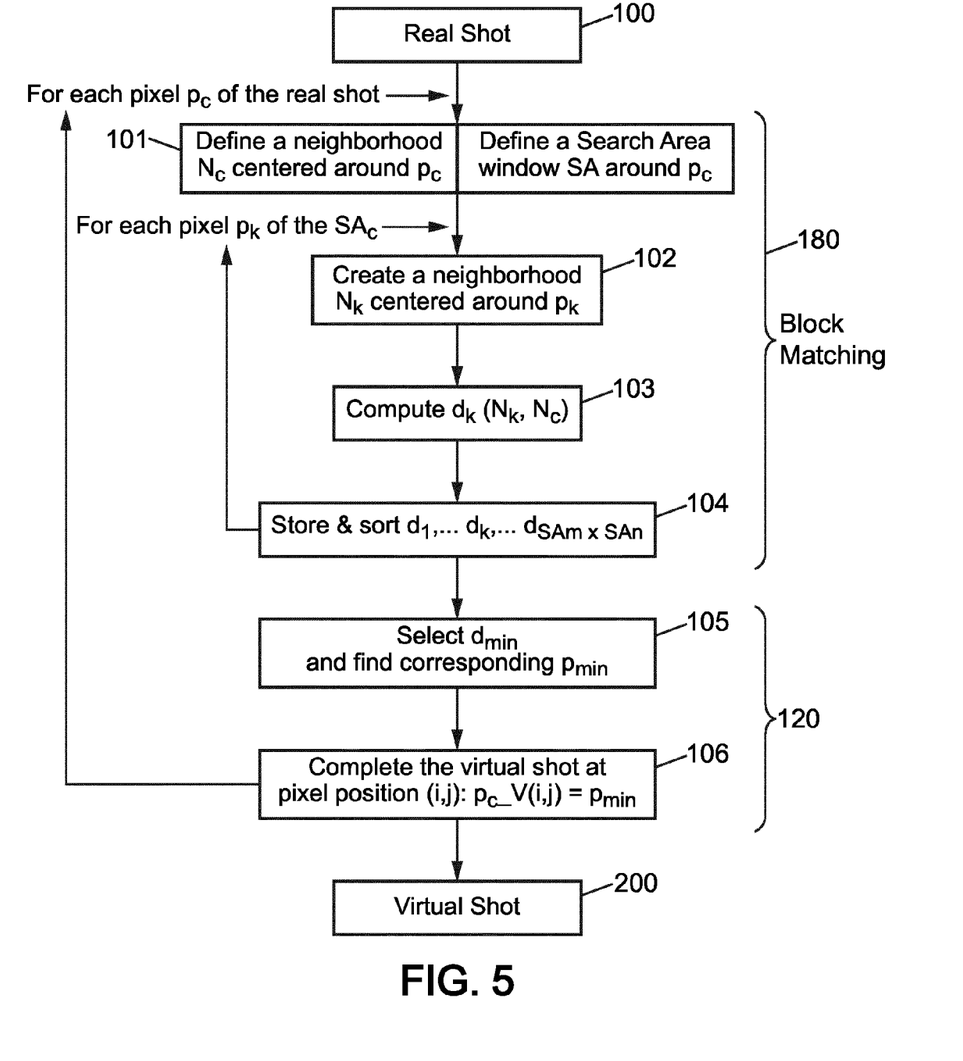
FIG. 5 is a flow diagram of a virtual multi image algorithm according to an embodiment.

The block diagram of FIG. 5 is a diagrammatic description of the virtual multi-shots creation algorithm. In a prior step, let us assumed that a first image 100 is captured or retrieved from e.g. a storage memory. In a first step 101 of a Block Matching operation 180, a first pixel 1 is selected, and a first neighbourhood 2 corresponding to first pixel 1 and search area window 3 are defined. In a second step 102, the second and subsequent pixels of the first image 100 are selected within the search area window and a corresponding neighbourhood containing at least the selected pixel is defined for each of these second and subsequent pixels. In a third step 103, the distances between the first and/or second and subsequent neighbourhoods are computed based on a formula using a range of defined parameters that can include, e.g., proximity, colour and/or quality parameters. According to a fourth step 104, the calculated distances are recorded and sorted according to the criteria specified, e.g. according to their magnitude.

The process of the Block Matching operation 180 may be repeated, for example iteratively, and the parameters adjusted as desired with each repetition of the operation prior to the steps of 102-104 being repeated. This allows generating respective distances between pixel $p_c$ on the one hand and at least some of the other pixels $p_k$ of the search area on the other hand. This may allow re-use of calculation results which may be common to different repetitions of operation 180, and thus in computation time saving.

In a first step 105 of a second operation 120, the data of the block matching operation is selected according to defined criteria. In the embodiment illustrated, the data corresponding to the smallest distance value is selected, i.e., the distance value with lowest magnitude. The selected pixel corresponding to the neighbourhood having the smallest distance value attribute is selected. In a second step 106 of the second operation, the pixel value (or pixel component values pixel values in case of a multi-channel colour space) $p_{c\_}V(i,j)$ of the pixel associated with the selected, minimum distance value $p_{min}$ is (respectively, are) attributed to a pixel 21, noted $p_c'$ in FIG. 4, at a position in a second image 200 corresponding to the position defined by co-ordinates (i, j), that is to say of the first selected pixel 1, relative to the boundary of the image.

The steps 102-106 of the first 180 and second 190 operations may be repeated iteratively until the second, virtual, image is created.

The process illustrated by FIG. 4 may be repeated starting from the same real shot 10 to obtain further, virtual, shots. Each iteration allows obtaining a virtual image from the same real image, thus providing virtual multi-shots which may eventually be used by a multi-shot image processing scheme.

Figure 6:
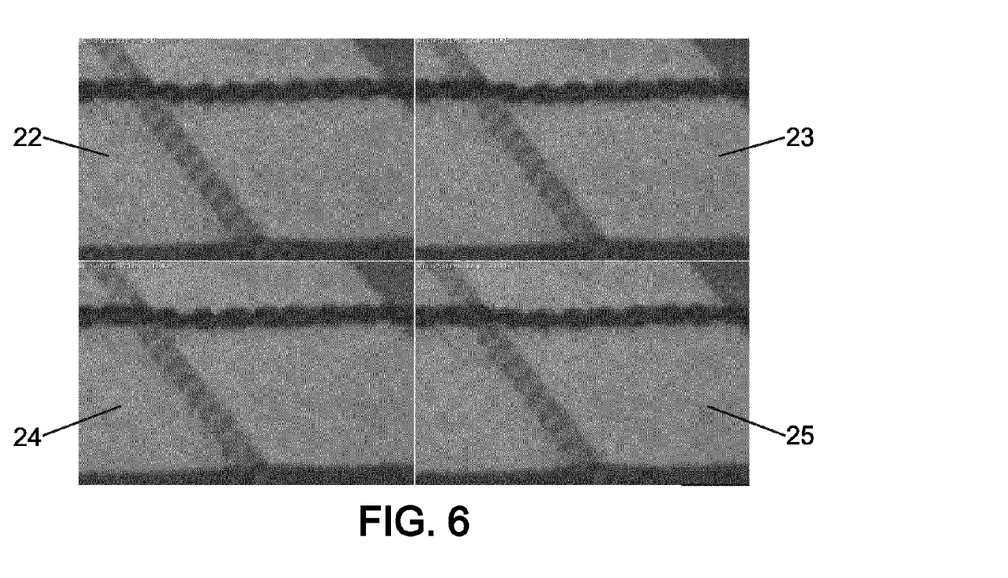
FIG. 6 is an example of a real image and three virtual images generated therefrom according to embodiments.

FIG. 6 illustrates second image 23 and subsequent images 24 and 25 created based on a single real image 22 in accordance with the process described by FIG. 4.

Second exemplary image 23 is created from an exemplary first image 22. Further exemplary images 24 and 25 are also shown as having the same superior quality and clarity of the second image 23. Each of the second and subsequent exemplary images is generated from the first image 22 based on modified and/or different parameters. For instance, further image 24 is created using a modified search area and neighbourhood size as compared to the parameters of second image 23. Further image 25 may be created based on a modified distance computation formula as compared to that used in the creation of the second image 23. In one example wherein the pixel values are coded in a multi-channel colour space (e.g. RGB, YUV, etc.) whereby any pixel value has a plurality of pixel component values respectively associated with each channel, the modified distance computation formula for the creation of the further image 25 may use different pixel component values as compared with pixel component values used by the distance computation formula for the creation of the second image 23 and of the further image 24.

Implementation of the method results in images having detail and edge information that is in the same position with respect to the real and virtual image boundaries. As is apparent from FIG. 6, indeed, the whole image content is of comparable quality in each of the three virtual images 23, 24 and 25 produced from the first image 22 irrespective of the respective variations in parameters used for the creation of each one of these three virtual images 23, 24 and 25.

Figure 7:
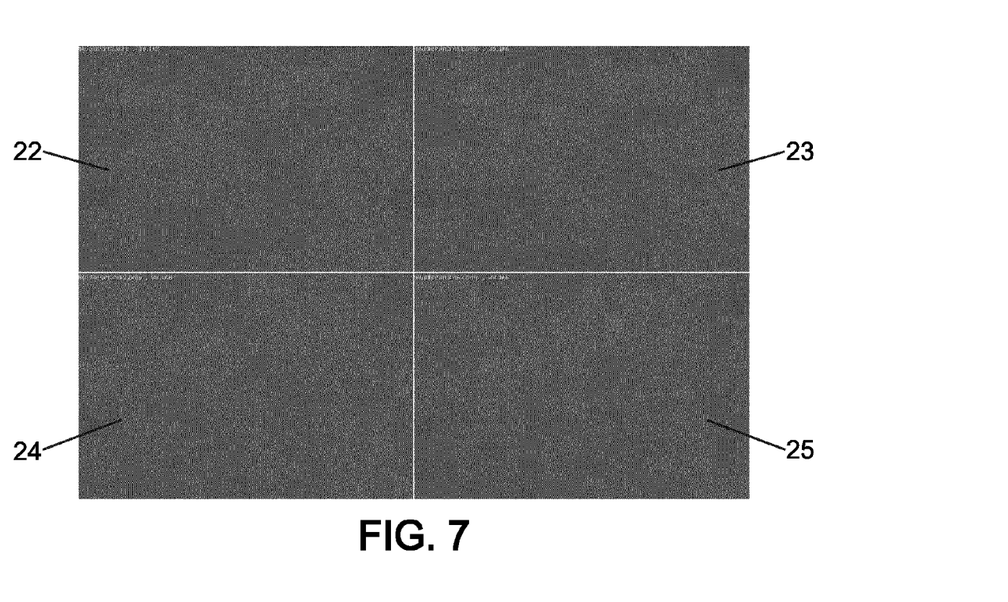
FIG. 7 is a more detailed example of the images of FIG. 5, shown at pixel level.

FIG. 7 shows the first exemplary image 22 and second and further exemplary images 23, 24, 25 at pixel level. As is apparent from FIG. 7, almost all pixels have been modified with e.g. temporal noise simulated by modifying the pixel value taken from the real image in the virtual images. Said modification simulates the effect of changes in noise level in a pixel over time. For example, in time lapsed between captured images change in noise levels may be caused by the quantum nature of light. Consequently, the noise level of a pixel is not the same between a shot at time t0 and a shot at time t1, later than t0. The proposed method may be regarded as a method of simulating the temporal noise by modifying the pixel value from the real shot to the virtual shots.

In addition, if images are captured by more than one device (e.g., CMOS, CCD, lens, etc.), noise may further result from the non-uniformity of the devices utilised. In the proposed embodiments of the method, irrespective of which parameters of the first real image are modified, the creation of a second and/or subsequent image from a first, real image simplifies the stabilization process, for instance, thus reducing the complexity of the algorithm required, with the results presented of uniform quality.

The proposed embodiments rely on the idea of creating virtual shots based on one shot. A main application may be the de-noising of images using multi-shots. Using virtual shots rather than real shots allow to:
  avoid stabilization step: as the virtual shots are generated from one shot, there is no impact of shake or scene movement;
  avoid capture latencies: only one shot is needed;
  avoid to process the image reconstruction pipeline on each frame: the virtual shots are created from one shot, whatever its position in the pipeline (sensor output, raw domain, RGB domain, YUV domain); and,
  reduce memories: contrary to a real multi-shots which require to store all the full shots, the first virtual shot can be created, used for the process and deleted, then another one is created and so on. Moreover, the virtual shots can be created only on a part of the image.

On the contrary, there are benefits to use real shot rather than virtual shots and it is important to quote them if we want to couple both real and virtual shots:
  real multi shots add new temporal information; and,
  information added by the multiple shots depends on the set of capture used (other light conditions, the flash being activated or not).

Embodiment of the method allow pixels reorganization inside an image by keeping/preserving its content. The noise level is the same but reorganized in term of pixel location. This provides a new interpretation of the image content and this new information can be used in spatial and temporal noise reduction algorithms:
  Spatial Noise Reduction: Bilateral Filter, Non Local Means, BM3D may apply the method on the virtual multi shots and combine the results to increase the final quality. In this case, the spatial transformation may be integrated directly within the algorithm;
  Temporal Noise Reduction: these algorithms use the temporal dimension to help in the discrimination between noise and detail. Virtual shots can replace or complete the shots taken at different time. Even if all shots are virtual, the result is still better than in the case where we only one real shot is used;
  Digital Image Stabilization (DIS), which in this context may be defined as the process of aligning data between several image frames: to reduce the blur effect, some DIS algorithms propose to decrease the exposure time. Nevertheless, the exposure time diminution is responsible for a high noise level. Consequently, some methods propose to take several shots to help in the noise/detail discrimination. Implementing the proposed embodiments allows replacing the shots taken at the same exposure with virtual shots.

For algorithms using multi-shots taken at different conditions, virtual shots can complete real multi-shots or play a role of security shot if there are too much movement between real multi shots.

High Dynamic Range algorithms can use not only real shots taken at different conditions to expand the level of information but also virtual shots to help in the noise reduction, for example.

Some Digital Image Stabilization algorithms propose to do a shot with a long exposure time (blurry image without noise) and a shot with short exposure time (sharp but noisy) and to merge both of them. When using the proposed method, if the de-noising quality is sufficient with virtual shots, the shot with the long exposure can be cancelled.

Figure 8:
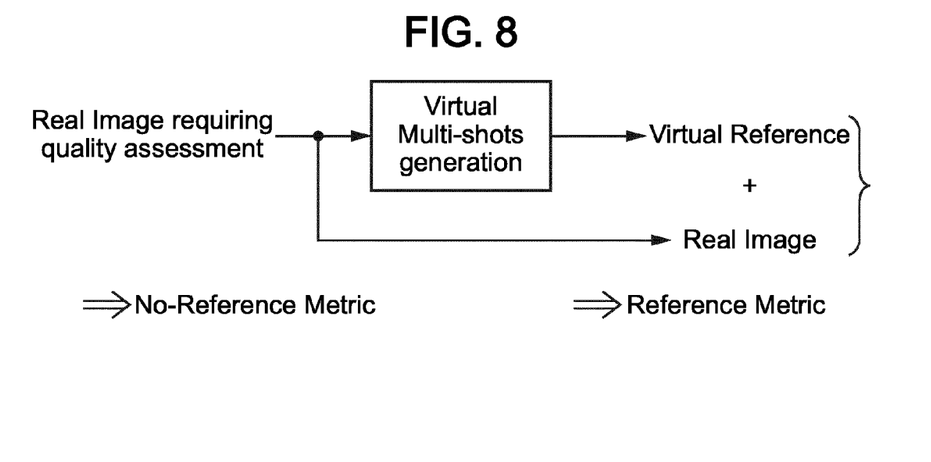
FIG. 8 is a diagram showing the concept of a further embodiment.

FIG. 8 illustrates a further application of the proposed virtual shot creation as applied to a method of assessing the quality of an image using reference metrics such as, for instance, PSNR, SSIM and/or DeltaE metrics used as a measure of image quality and requiring at least one reference image.

Indeed, such metrics need an image reference to be able to detect the level of similarity or colour shift between the reference and the noisy image. These metrics are exploitable only if a reference image is available. By using the proposed virtual shot creation methodology, a virtual reference image may be created and reference metrics may be adapted to non-reference metrics as it is illustrated in the FIG. 8.

According to the embodiment of FIG. 8, the reference metric of a first image requiring quality assessment is adapted to the non-reference metric of the second and/or subsequent image. The second or subsequent image is used as a comparator adapted to compare the second or subsequent image to the first image to detect parameters including similarity, colour shift and for level of noise.

Figure 9:
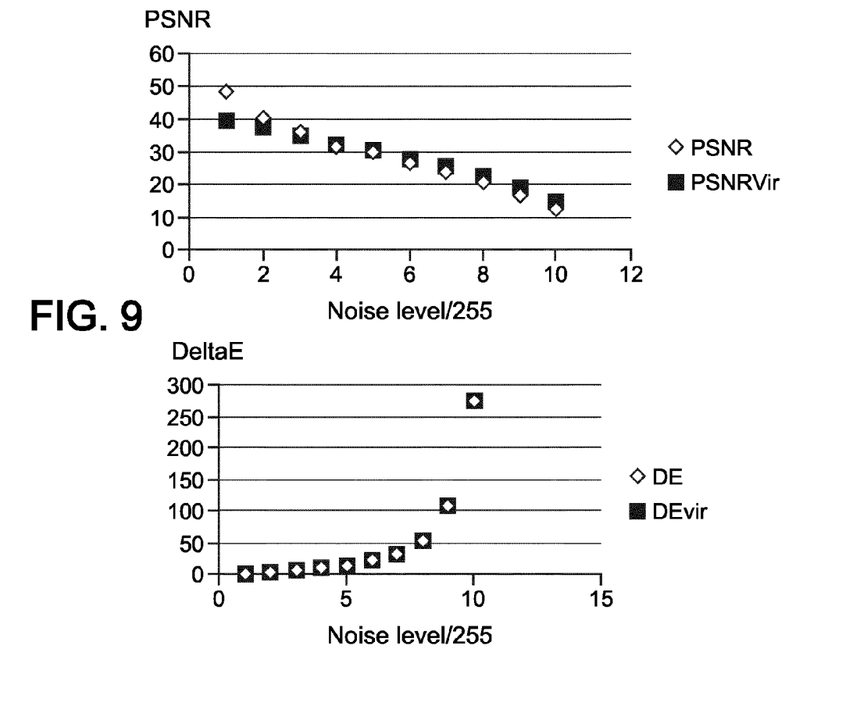
FIG. 9 is a graphical depiction of results obtained on reference metrics PSNR (peak signal to noise ratio) and DeltaE.

For instance, the graphs of FIG. 9 depict results obtained by the process of adapting the reference metrics PSNR and Delta-E to non-reference metrics. A Gaussian noise with zero mean and different values of sigma is applied to a first image and second and subsequent images are generated. PSNR and DeltaE reference metrics compute a result between the non noisy and noisy images thus creating a pair of curves in each graph shown, noise level data in a first real image being depicted by diamonds and noise level in second or subsequent virtual image being depicted by squares. Both PSNR and DeltaE demonstrate desirable behaviours in that PSNR is decreasing with high levels of noise and DeltaE increasing, indicating increased image quality. In parallel, the second and subsequent, noisy images may be processed, and the PSNR and DeltaE metric computed by replacing the non noisy image with the virtual reference.

Figure 10:
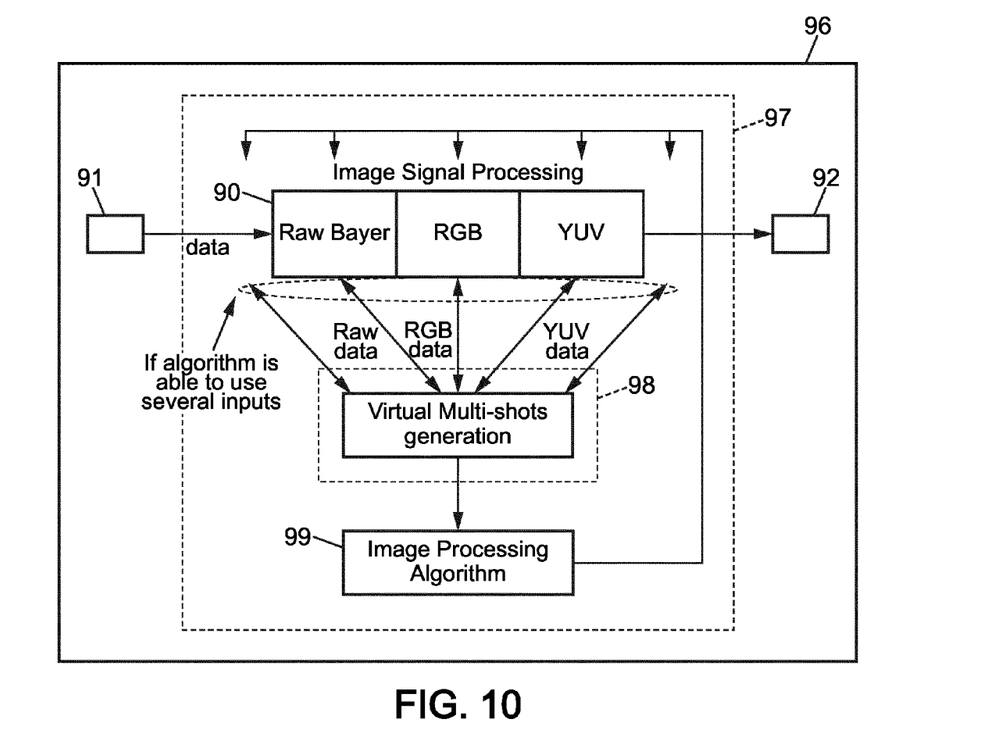
FIG. 10 describes the position and interaction of the virtual multi image generation scheme inside an electronic device.

The image signal processing block diagram of FIG. 10 illustrates the position and interactions of virtual multi-shots generation inside an electronic device 96 having a processor 97 with processing units adapted to perform at least the steps of the method according to the embodiments described herein.

Image data captured by an image sensor or imager 91 is inputted into an image processing pipeline of the type commonly utilised between an image source and an image renderer. The steps in said image pipeline may utilise Raw Bayer data directly from photodiodes in an image sensor, and overlay said data with colour filters such as RGB and/or YUV.

According to an embodiment, within said processor 97, the process of virtual shot generation may be performed by processing units in the form of, e.g., IP blocks of a computer program 98 implementing at least the steps described in the block diagram of FIG. 5.

A specified image processing algorithm 99 using second and/or subsequent, for example virtual, shots generated from a first shot produces data that is capable of use in one, some or all stages of processing within the pipeline. Such algorithm may be of any type as previously described, including image quality enhancements algorithms and image quality assessment algorithms using reference metrics.

The comparison of real and second and/or subsequent shots can be added at one, several or all stages of the pipeline. If the algorithm of the pipeline is able to receive a plurality of inputs a plurality of information is collated to generate one or more virtual images. The virtual images may be processed by an algorithm 99 and subsequently fed into the image pipeline prior to generation of image signal processing output. At each of the stages of the pipeline for which algorithm data is inputted, the information outputted in response to the data input may be used as a first image for the creation of further images in an iterative process and/or directly utilised in the pipeline to create an ISP output.

The ISP output subsequently stored in a memory 92 may thus be comprised of a demosaiced image having an appropriate colour and brightness value attributed to each pixel that has been denoised using a denoising algorithm either in a single process or iteratively as described.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

A person skilled in the art will readily appreciate that various parameters disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims

The invention claimed is:

1. A method of creating at least a second image from a first image, defined by pixel values, comprising:
   selecting a first pixel in the first image at a position defined by coordinates in the first image;
   defining a first neighbourhood of pixels around the first pixel of the first image, said first neighbourhood of pixels having defined size and position;
   defining a further neighbourhood of pixels as a search area window of defined size and position sufficient to contain at least the first pixel;
   selecting second and subsequent pixels in the first image, said second and subsequent pixels being different from the first pixel and contained within the search area window;
   defining second and subsequent neighbourhoods of pixels of defined size and position around each second and subsequent pixel selected, respectively, said size of said second and subsequent neighbourhoods of pixels corresponding to the size of the first neighbourhood of pixels;
   computing distance values between the first neighbourhood of pixels and second on the one hand, and subsequent neighbourhoods of pixels on the other hand;
   processing the computed distance values;

selecting, among the second and subsequent neighbourhoods of pixels, one neighbourhood of pixels corresponding to a chosen distance value;

selecting a reference pixel in the first image corresponding to the pixel in the first image associated with the selected neighbourhood of pixels;

attributing the value of the selected reference pixel to a pixel at defined position in the second image corresponding to the position of the first pixel in the first image relative to the first image boundaries; and completing the second image by repeating the above steps for further pixels in the first image.

2. The method of claim 1, further comprising the steps of:

selecting, among the second or subsequent neighbourhoods of pixels, one or more further neighbourhood of pixels corresponding to one or more further chosen distance value, respectively;

selecting one or more further reference pixels in the first image corresponding to the one or more further selected neighbourhood of pixels, respectively;

attributing the value of the one or more further selected reference pixels to one or more pixels at a same position in one or more further images, respectively, as position of said selected reference pixel in the first image; and completing the one or more further images by repeating the above steps for the further pixels in the first image to create one of more further images.

3. The method of claim 1, wherein the chosen distance value is the lowest distance value.

4. The method of claim 2, wherein the size and/or position of the first, second and/or subsequent neighbourhood of pixels are modified for the creation of the one or more further images, as compared with the creation of the second image.

5. The method of claim 2, wherein selecting one or more further neighbourhood of pixels among the second or subsequent neighbourhood of pixels corresponding to a chosen distance value is performed, for the one or more further images, based on a modified distance computation formula for computing of the distance values, as compared with the selecting of a second or subsequent neighbourhood of pixels for the second image.

6. The method of claim 5, wherein pixel values of the first image are coded in a colour space having at least two channels, and wherein the modified distance computation formula uses different pixel component values as compared with pixel component values used by the distance computation formula for the selecting of a second or subsequent neighbourhood of pixels for the second image.

7. Method of enhancing quality of a real image comprising:

generating at least one virtual image from the real image by applying the method of claim 1; and implementing a multi-shot image quality enhancement scheme based on the real image and the virtual image.

8. The method of claim 7 wherein the multi-shot image quality enhancement scheme is one of Temporal Noise Reduction algorithm, Spatial Noise Reduction algorithm, and Digital Image Stabilization algorithm.

9. Method of assessing the quality of a real image comprising:

generating at least one virtual image from the real image by applying the method of claim 1; and computing an image quality metric for the real image based on the virtual image as reference image.

10. The method of claim 9, wherein the image quality metric is one of a peak signal-to-noise ratio, PSNR metric, a structural similarity index, SSIM metric, and a DeltaE metric.

11. A non-transitory computer readable medium comprising instructions for implementing all the steps of the method to create at least a second image from a first image according to claim 1, when the program is executed by a processor.

12. A device adapted to create at least a second image from a first image, defined by pixel values, said device comprising:

an input configured to receive the first image;
an output configured to output the second image; and
a processor coupled to the input and output, wherein the processor is configured to select a first pixel in the first image at a position defined by coordinates in the first image;

define a first neighbourhood of pixels around the first pixel of first image, the first neighbourhood of pixels having defined size and position;

define a further neighbourhood of pixels as a search area window of defined size and position sufficient to contain at least the first pixel;

select second and subsequent pixels in the first image, said second and subsequent pixels being contained within the search area window;

define second and subsequent neighbourhoods of pixels of defined size and position centered around each second and subsequent pixel selected, respectively, said size of said second and subsequent neighbourhoods of pixels corresponding to the size of the first neighbourhood of pixels;

compute distance values between the first neighbourhood of pixels and second on the one hand, and subsequent neighbourhoods of pixels on the other hand;

process the computed distance values;

select, among the second and subsequent neighbourhoods of pixels, one neighbourhood of pixels corresponding to a chosen distance value;

select the reference pixel in the first image corresponding to pixel in the first image associated with the selected neighbourhood of pixels;

attribute the value of the selected reference pixel to a pixel at a defined position in the second image corresponding to the position of the first pixel in the first image relative to the first image boundaries; and complete the second image by processing further pixels of the first image in the same manner as the first pixel.

13. The device of claim 12, wherein the chosen distance value is the lowest distance value.

14. A electronic device comprising a processing device according to claim 12.

* * * * *